May 29, 1962 A. LINZ, JR 3,037,180

N-TYPE SEMICONDUCTORS

Filed Aug. 11, 1958

INVENTOR.
ARTHUR LINZ, JR.
BY Harold L. Gammons
Agent 3,037,180
N-TYPE SEMICONDUCTORS Arthur Linz, Jr., Plainfield, N.J., assignor to National Lead Company, New York, N.Y., a corporation of New Jersey Filed Aug. 11, 1958, Ser. No. 754,474
9 Claims. (Cl. 338—327)

This invention relates in general to semiconductors and more particularly to improved n-type semiconductors and their method of manufacture.

The term semiconductor refers in the art to those materials, the electrical properties of which are intermediate those of metals which conduct electricity very well, and insulators which conduct electricity hardly at all. Semiconductors are however more easily understood in terms of insulators, and in a sense may be considered imperfect insulators, the semiconducting properties of which result from the features possessed by their imperfections. These imperfections are divided into three broad classes, namely the excess electron, the incomplete bond or hole, and the deathnium imperfection. The species of semiconductor with which the instant invention is immediately concerned are those which derive their conductivity not from light or from the generation of hole-electron pairs by the diathnium process but from the presence of certain chemical impurities, known as donors, which provide the semiconductor with a permanent or built-in conductivity, characterized by the presence of an excess electron in the crystal lattice.

Semiconductors of this type are used for the manufacture of transistors, thermistors, rectifiers, etc. and are known as n-type semiconductors, since their conductivity is produced by negative carriers of current.

Typical of these n-type semiconductors are the rutile single crystals described by Zerfoss et al. in "The Journal of Chemical Physics," vol. 16, No. 12, 1166, December 1948, and the alkali metal titanates, such as barium titanate and the strontium titanate single crystals described by Arthur Linz, Jr. in "The Physical Review," vol. 91, No. 3, 753–754, August 1, 1953.

While the commercial potential of n-type semiconductors is tremendous their use has been curtailed seriously by their high and variable resistances caused by the very high contact resistances at the interface of the semiconductor and its electrode. Typical of such high resistance contacts are the platinum and silver pastes currently in use as well as metallic films of gold, platinum, etc. In an article entitled "New Low Contact Resistance Electrode" which appeared in "The Journal of Applied Physics," vol. 27, p. 190, 1956, S. S. Flaschen and others describe the use of rubbed-on indium amalgam and indium gallium contacts, which gave both minimum and constant resistance values over a wide voltage range. However these indium amalgam and indium gallium contacts have been shown to have the current transmitting characteristics of a rectifier, i.e. non-ohmic in character. Moreover they are unstable above room temperature with repeated cycling.

It is highly desirable therefore that contact-means for oxidic n-type semiconductors be developed which is truly ohmic, i.e. has none of the characteristics of a rectifier, has a minimum and constant resistance value over a wide voltage range, and is stable at room temperatures and above with repeated cycling.

An object therefore of the present invention is to provide an improved n-type semiconductor.

A further object of the invention is to provide an n-type semiconductor having ohmic, stable, electrode contact-means of low and constant resistance.

A still further object of the invention is to provide an improved method and means for forming ohmic, stable, electrode contact-means of low and constant resistance on n-type semiconductors.

These and other objects, features and advantages of the invention will be described in more detail in the following specification and drawings in which.

In its broadest aspects the instant invention relates to an n-type semiconductor comprising a body of high dielectric constant material and an ohmic, stable, contact-means of low and constant resistance arranged to form a current carrying connection between an electrode and said body. The invention also contemplates a method of making an improved n-type semiconductor, including the steps of forming a body of material selected from the group consisting of rutile and alkaline earth metal titanates, including minor amounts of rare earth oxides, applying an ohmic, stable, contact-means of low and constant resistance to said body and securing an electrode to said contact-means said contact-means forming a current carrying connection between said electrode and the body of said semiconductor. The n-type semiconductor of this invention may be connected in series in the winding of an electric motor, especially the hermetically sealed type of motor used in air-conditioning and refrigeration units, to operate an external relay which automatically de-energizes the motor when overheating occurs.

Figure 1:
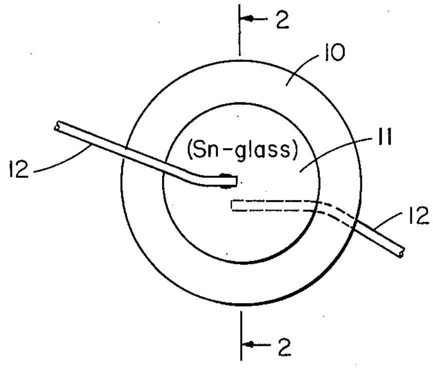
FIGURE 1 is a front elevation of an n-type semiconductor embodying the improved contact-means of this invention.
Figure 2:
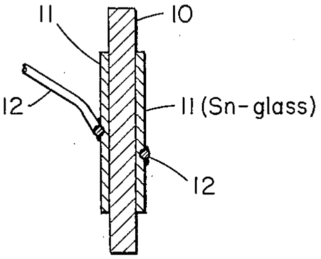
FIGURE 2 is a sectional view on line 2—2 of FIGURE 1.

Referring to the drawings, FIGURE 1 illustrates an n-type semiconductor comprising a body 10 of ceramic material, such as barium or strontium titanate including tantalum, tungsten, niobium, lanthanum or other rare earth metal oxides. Applied to opposite faces of the body 10 are ohmic, stable, contact-means 11—11 of low and constant resistance which, in this embodiment of the invention, comprise a fired-on mixture of powdered metallic tin and a low melting glass frit composition. The electrodes 12—12 of the semiconductor are secured to the respective contact-means 11—11 by a soft solder such as a silver-lead solder or the like.

Referring again to the n-type semiconductor 10 this may comprise rutile in the form of a single crystal, or an alkaline earth metal titanate containing rare earth metal oxides. Among the most useful are rutile crystal semiconductors containing oxides of niobium, tungsten, tantalum, etc.; and barium titanate semiconductors containing small amounts of the oxides of tungsten, tantalum, niobium, antimony, lanthanium and other rare earth metals. N-type semiconductors in this category are described in detail in the British Patent No. 714,965 issued September 8, 1954.

After the semiconductive material has been shaped and/or sintered the contact-means of this invention is applied to each face of the semiconductor in the form of a paste, which is prepared by admixing powdered metallic tin with a low temperature-melting glass frit composition and a volatile organic medium.

The powered metallic tin should be finely divided and of high purity. The glass frit composition should have a maturing range within the temperatures from 400 to 500° C. Such glasses include among others lead borate, lead silicate and lead borosilicate, typical formulas being listed below.

TABLE I

*Glass Frit Compositions*

| | A | B | C | D |
|---|---|---|---|---|
| Weight Percent: | | | | |
| $PbO$ | 85 | 85 | 80 | 80 |
| $SiO_2$ | 15 | 0 | 10 | 0 |
| $B_2O_3$ | 0 | 15 | 10 | 20 |
| Batch Weight (grams): | | | | |
| $PbO$ | 42.5 | 42.5 | 40 | 40 |
| $SiO_2$ | 7.5 | 0 | 5 | 0 |
| $H_3BO_3$ | 0 | 13.3 | 8.9 | 17.7 |
| Smelting Temperature, ° C. | +800 | −800 | −800 | −800 |
| Fired (to glass) @ 450° C. | ---------- | glossy | semi-glossy | glossy |

The ratio of tin to glass in the aforesaid mixtures may vary considerably. However it has been found desirable to employ tin to glass ratios in the range of from 3:1 to 10:1 by weight. It has been found that with ratios having higher glass content the contact-means 11—11 will possess greater mechanical strength at high temperatures but at the sacrifice of electrical conductivity.

The powdered tin and the glass frit composition are thoroughly mixed as for example, by dry blending and to this mixture is added enough vehicle in the form of a volatile organic medium to form a smooth paste or liquid of suitable consistency to brush or spray onto the semiconductor. The aforesaid vehicle used in preparing the liquid mixture may be any mixture of liquid which will provide a vehicle for the glass frit and metallic tin, whereby the latter may be applied by brush or the like to the surface of the semiconductor; and which, when fired to temperatures sufficiently high to mature the glass frit composition, will completely volatilize without leaving a carbon deposit or similar impurities in the glass. A typical vehicle is one which includes pine oil, hydrogenated rosin, methyl abietate and ethyl cellulose.

After the contact forming-paste has been applied it is fired at a temperature in the range of 400–500° C. to volatilize the vehicle and mature the tin-glass composition. The electrode leads 12—12 are then soldered to the fired pastes 11—11 after burnishing the latter.

In order to illustrate this form of the invention in greater detail the following example is given.

EXAMPLE I

An n-type semiconductor comprising sintered barium titanate having tin-glass contact-means was prepared as follows:

The barium titanate semiconductor material was prepared by firing finely divided barium titanate containing 0.2% lanthanum at 1350° C. for 20 hours. The tin-glass paste used to coat the semiconductor material was prepared by mixing a lead borate glass frit composition with very finely divided substantially pure tin metal powder and organic vehicle.

The lead borate glass frit composition was prepared by admixing 42.5 grams of $PbO$ with 13.3 grams of $H_3BO_3$ and melting the mixture at 800° C. for 1 hour in a fire clay crucible. The molten glass was then formed into a frit by pouring into cold water which was dried at 150° C. overnight, ball milled for 16 hours in ethyl alcohol and redried. 10 grams of the tin powder were mixed with 2 grams of the glass frit to form a 5:1 weight ratio. The mixture of glass and tin was mixed with 2 grams of vehicle known to the trade as "dope" consisting essentially of pine oil, hydrogenated rosin, methyl abietate and ethyl cellulose, which formed a smooth paste which was suitable for brushing onto the surface of the barium titanate semiconductor material.

The paste was applied as a coating approximately 0.2 mm. thick to the barium titanate and the coated barium titanate was then air dried at 125° C. for 1 hour and fired at 450° C. for 30 minutes. Electrode leads were then soldered to the fired-on tin-glass contacts using a soft solder.

In order to compare the performance of n-type semiconductors having the tin-glass contact-means of the instant invention with n-type semiconductors of a similar ceramic composition but provided with indium-gallium alloy contacts, the resistances of the respective semiconductors were first measured at room temperature and then at temperatures of 175° C. Thereafter the semiconductors were cooled to room temperature and the resistances again measured. In the case of the semiconductors having indium-gallium alloy contacts the resistance at room temperature was 20 ohms, while the resistance at 175° C. was measured at 200 ohms. Upon cooling, the resistance at room temperature had increased from 20 ohms to 100 ohms. In contradistinction while the initial resistance of the semiconductor of the instant invention was 20 ohms at room temperature, upon cooling from 175° C. to room temperature, its resistance had again dropped to 20 ohms and this relatively stable condition persisted through several temperature cycles.

EXAMPLE II

A second n-type semiconductor was made using a sintered barium strontium titanate containing 0.2% lanthanum and having tin-glass contact-means of the same composition applied thereto in the same manner as described in Example I above. To these contacts were soldered a pair of electrodes.

This n-type semiconductor was tested in the manner used in testing the n-type semiconductor described in Example I above, and it was found to have the same initial resistance as those of an n-type semiconductor of the same composition but having indium-gallium contacts. However, whereas the resistance of the latter had increased to 100 ohms following the cooling of the semiconductor to room temperature the resistance of the semiconductor having the improved contact-means of this invention remained stable, i.e., at its original resistance at room temperature through several temperature cycles.

Figure 3:
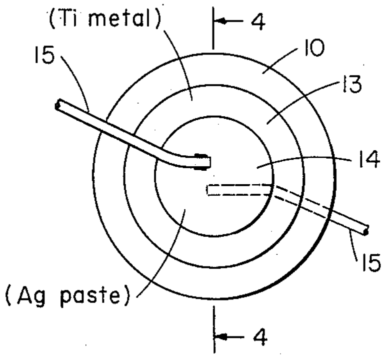
FIGURE 3 is a front elevation of a modification of the improved contact-means for n-type semiconductor.
Figure 4:
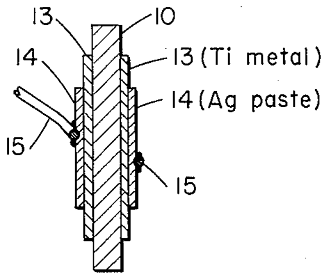
FIGURE 4 is a sectional view on line 4—4 of FIGURE 3.

Referring again to the drawings, FIGURES 3 and 4 illustrate a modification of the instant invention wherein an n-type semiconductor material 10 is provided on opposite faces with contact-means comprising titanium metal coatings 13—13.

To the exposed surface of each of these titanium metal coatings is applied a low-firing silver or platinum paste 14—14 of the type in current use. After each paste has been fired it is burnished and then electrodes 15—15 are attached to each fired-on paste by conventional techniques such as for example by the use of a soft solder or the like.

The application of the titanium metal coatings 13—13 to the respective faces of the semiconductor is carried out by first abrading the respective surfaces of the semiconductor and then pressing these surfaces successively against a titanium metal wheel turning at high speed. As a consequence, titanium metal is transferred from the periphery of the wheel onto the respective surfaces of the semiconductor to form a titanium metal plate or coating 13—13 thereon.

The low-firing silver or platinum paste 14—14 is then brushed onto the exposed surfaces of the titanium metal coatings 13—13, air dried and then fired after which the aforesaid electrodes 15—15 are secured by soldering or equivalent means to the burnished surfaces of the fired paste 14—14.

In order to illustrate this modification of the invention in more detail the following example is given.

EXAMPLE III

An n-type semiconductor comprising sintered barium titanate containing 0.2% lanthanum was provided with titanium metal contact-means as follows. A ⅜ inch diameter by ¼ inch thick wheel was fabricated from titanium metal having a Vickers hardness number 75.

This wheel was mounted on a 1/8 inch mandrel in a high speed hand grinder. The semiconductor 10 was first abraded on both surfaces with 240 grit silicon carbide after which the abraded surfaces of the semiconductor were pressed against the titanium metal wheel turning at a speed of about 20,000 r.p.m.

A coating of titanium metal approximately 0.02 mm. thick was thus formed on each face of the semiconductor.

A commercially available silver paste comprising powdered silver, a low melting glass and a liquid vehicle was then brushed onto the respective titanium metal coatings to provide a film approximately 0.2 mm. thick. After being air dried the silver paste was fired for 10 minutes at a temperature of 425° C. Thereafter the fired-on silver paste was burnished and the electrodes were soldered thereon using soft solder.

In order to compare the performance of n-type semiconductors having the titanium metal contact-means of the instant invention with n-type semiconductors of a similar ceramic composition but provided with indium-gallium alloy contacts, the resistances of the respective semiconductors were first measured at room temperature and then at temperatures of 175° C.

Thereafter the semiconductors were cooled to room temperature and the resistances measured again. In the case of the semiconductors having indium-gallium alloy contacts the resistance at room temperature was 60 ohms, while the resistance at 175° C. was measured at 100,000 ohms. Upon cooling, the resistance at room temperature had increased to 510 ohms. In contradistinction, while the initial resistance of the semiconductor having titanium metal contact-means was 100 ohms at room temperature, upon cooling from 175° C. to room temperature its resistance had again dropped to 100 ohms and its relatively stable resistance persisted through several temperature cycles.

From the foregoing description it will be evident that the improved contact-means of this invention are not only truly ohmic but have a minimum resistance which remains constant even after being subjected to repeated temperature cycling. Although indium-gallium and indium amalgam rubbed-on contacts produce low contact resistances, nevertheless they are not truly ohmic and are unstable above room temperatures with repeated cycling. While the explanation is not clearly understood it is postulated that the instability and consequent high contact resistances of the indium-gallium and indium amalgam contacts may be due to diffusion of the contact metal into the semiconductor where it nullifies the n-type conductivity by substituting a lower valency ion for the titanium or other cation thereby building up a high resistivity layer in the semiconductor adjacent to the contact. This supposition appears to be substantiated by the discovery that when the contact is selected from those metals that diffuse into the semiconductor with the same or higher valence state than the cation of the semiconductor which they displace, or which go in interstitially, the contacts are characterized by low resistance and excellent stability over extended temperature cycles. Typical examples are the tin-glass contact-means and the titanium metal contact-means of the instant invention. Other contact-means would include such metals as beryllium, zirconium, niobium, tungsten, and tantalum.

The advantages of the invention are apparent from the foregoing disclosure. In general it provides an n-type semiconductor with new and superior contact-means prepared from metals having a higher valence state than the cations of the semiconductor and characterized by an ohmic, stable, low and constant resistance over successive temperature cycles. The invention provides also for the production of superior n-type semiconductors of rutile or alkaline earth metal titanates having minor amounts of rare earth metal oxides by applying metal contact-means in the form of a rubbed-on titanium metal coating or a fired tin-glass paste to the semiconductor and then securing an electrode to the aforesaid contact-means.

While this invention has been described and illustrated by the examples shown, it is not intended to be strictly limited thereto, and other variations and modifications may be employed within the scope of the following claims.

I claim:

1. An n-type semiconductor comprising in combination; a sintered body member consisting essentially of an admixture of a high dielectric constant material selected from the group consisting of rutile, alkaline earth metal titanates and mixtures thereof, and from about 0.2% to about 0.6% of a rare earth metal oxide; and ohmic, stable, metallic electrode contact means applied to said sintered body member, said contact means being selected from the group consisting of a fired-on admixture of a lead-borate glass frit and powdered tin in the ratio of 1 part glass to from 3 to 10 parts tin by weight, and titanium metal applied by rubbing onto said sintered body member.

2. An n-type semiconductor according to claim 1 wherein said contact means consists essentially of a fired-on admixture of a lead-borate glass frit and powdered tin in the ratio of 1 part glass to from 3 to 10 parts tin by weight.

3. An n-type semiconductor according to claim 1 wherein said contact means consists essentially of titanium metal applied by rubbing onto said sintered body member.

4. An n-type semiconductor comprising in combination; a sintered body member consisting essentially of an admixture of barium titanate and from about 0.2% to about 0.6% of lanthanum oxide; and ohmic, stable, metallic electrode contact means applied to said sintered body member, said metallic electrode contact means being selected from the group consisting of a fired-on admixture of a lead-borate glass frit and powdered tin in the weight ratio of 1 part frit to 5 parts tin, and titanium metal applied by rubbing onto said body member.

5. An n-type semiconductor according to claim 4 wherein the lanthanum oxide consists essentially of 0.2% lanthanum oxide and said contact means consists essentially of a fired-on admixture of a lead-borate glass frit and powdered tin in the weight ratio of 1 part frit to 5 parts tin.

6. An n-type semiconductor according to claim 4 wherein the lanthanum oxide consists essentially of 0.2% lanthanum oxide and said contact means consists essentially of titanium metal applied by rubbing onto said body member.

7. An n-type semiconductor comprising in combination; a sintered body member consisting essentially of an admixture of barium strontium titanate and about 0.2% to about 0.6% lanthanum oxide; and an ohmic, stable, metallic electrode contact means applied to said sintered body member, said metallic electrode contact means being selected from the group consisting of a fired-on admixture of a lead-borate glass frit and powdered tin in the weight ratio of 1 part frit to 5 parts tin, and titanium metal applied by rubbing onto said body member.

8. An n-type semiconductor according to claim 7 wherein the lanthanum oxide consists essentially of 0.2% lanthanum oxide and said contact consists essentially of a fired-on admixture of a lead-borate glass frit and powdered tin in the ratio of 1 part glass to 5 parts tin.

9. An n-type semiconductor according to claim 7 wherein said rare lanthanum oxide consists essentially of 0.2% lanthanum oxide and said contact means consists essentially of titanium metal applied by rubbing onto said body member.

References Cited in the file of this patent

UNITED STATES PATENTS 2,461,878 Christensen et al. ________ Feb. 15, 1949
2,533,140 Rodriquez ______________ Dec. 5, 1950

(Other references on following page)

UNITED STATES PATENTS

| | | |
|---|---|---|
| 2,614,144 | Howatt | Oct. 14, 1952 |
| 2,629,800 | Pearson | Feb. 24, 1953 |
| 2,724,761 | Cisne | Nov. 22, 1955 |
| 2,782,492 | Frost | Feb. 6, 1957 |
| 2,793,420 | Johnston et al. | May 28, 1957 |

OTHER REFERENCES

Megaw: "Origin of Ferroelectricity in Barium Titanate and Other Perovskite-Type Crystals," Acta Gryst. (1952), 5.739, pp. 739–749.